United States Patent Office 3,231,855
Patented Jan. 25, 1966

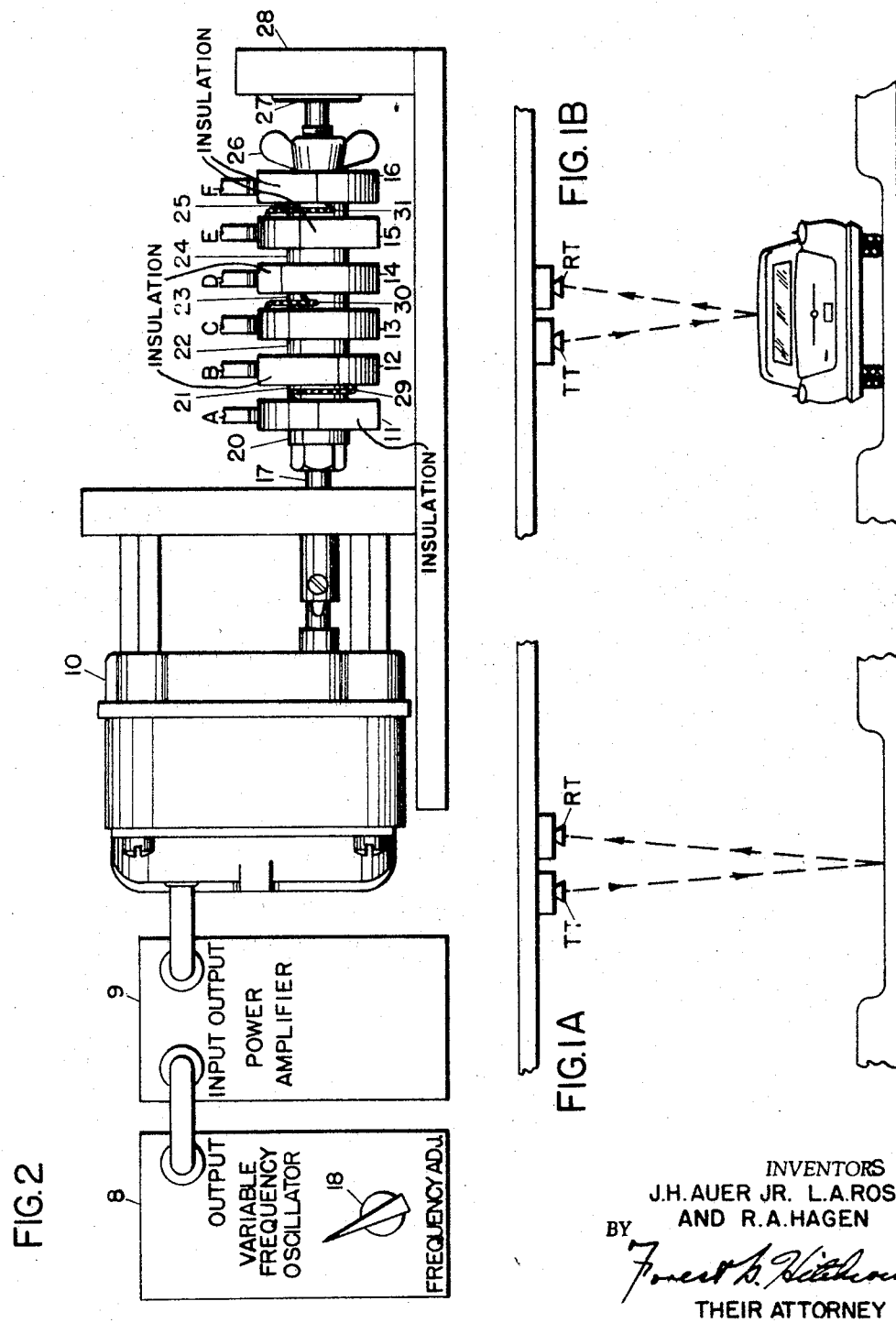

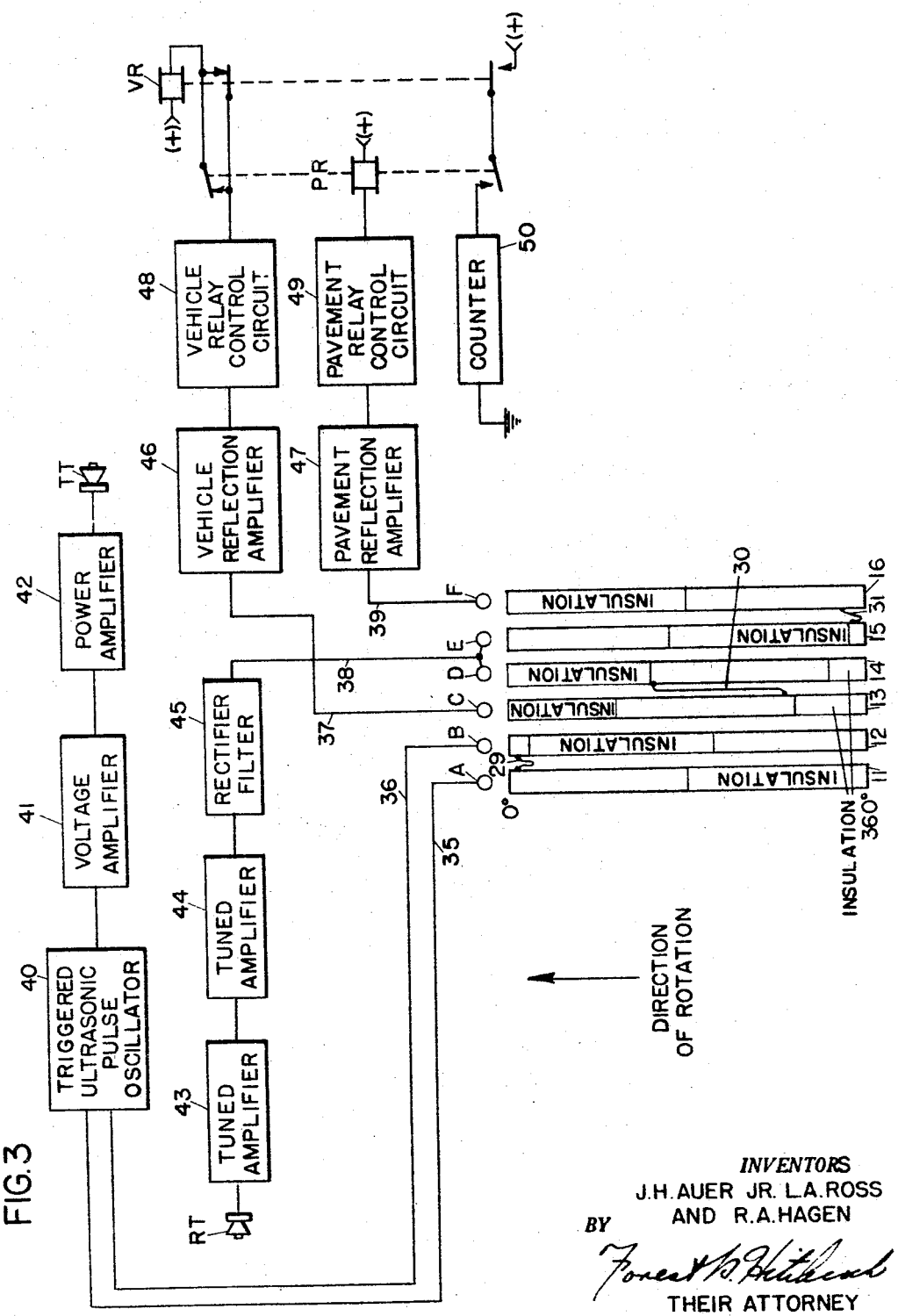

3,231,855
OBJECT DETECTION SYSTEM
John H. Auer, Jr., Lyle A. Ross, and Robert A. Hagen, Rochester, N.Y., assignors to The General Signal Corporation, Rochester, N.Y., a corporation of New York
Filed Feb. 6, 1963, Ser. No. 256,716
12 Claims. (Cl. 340—38)

This invention relates to a system for detecting objects which intersect a beam of energy and more particularly, relates to such a system which is locally and manually adjustable to be operative within a variety of environments. This invention is analogous in subject matter and is to be regarded as in the nature of an improvement over what is disclosed and claimed in N. A. Bolton et al., Patent No. 3,110,009, issued November 5, 1963.

Prior detection systems, such as disclosed in Patent No. 3,042,303 issued to Kendall et al. on July 3, 1962 effect the detection of objects, such as vehicles, by the provision of a transmission system including a transducer for the generation and propagation of discrete pulses of sound energy towards a reflecting surface. The sound pulses in impinging upon the reflecting surface define a detection zone. The sound pulses, which exhibit quasi optical properties at the frequency employed are reflected back towards a receiving system including a receiving transducer. Should a vehicle be present in the detection zone, the discrete pulses of sound energy are reflected from the surface of the vehicle back to the same receiving transducer. However, in this latter instance, the round trip transit time of the transmitted sound pulse is shorter in accordance with the displacement of the upper surface structure of the vehicle with respect to the pavement. The system is provided with electronic gating means which selectively render distinct circuits of the receiver operative to effect suitable controls in accordance with the expected different times of reception of a pavement reflection and a vehicle reflection.

The aforementioned patent of Bolten et al., which is assigned to the assignee of the present invention, provides a more simplified vehicle detection system of the character described wherein the more complex electronic gating and timing circuits are replaced by a constant speed device, preferably a synchronous motor, which is utilized in conjunction with a plurality of disclosed structures to cause the transmitting system to generate a sound pulse of selected width at a pulse repetition frequency which is a function of the angular velocity of the constant speed device and also to establish successive receiver gating intervals for each revolution of the constant speed device during which selected circuits of the receiving system will be rendered operative as determined by the expected time difference between the reception of a pavement reflection and a vehicle reflection.

The Bolton patent discloses a plurality of embodiments, all of which accomplish the required receiver gating and transmitting timing functions in a fixed, i.e. locally non-adjustable manner. Once the operating environment of the system is designated and the placement of the transducers is established, e.g. at some fixed height with respect to the pavement in view of the available mounting means and the size of the objects to be detected, the receiver gating and transmitter timing circuits are established by means of factory adjustment. In the event that the system is subsequently used in a different environment or to detect a class of objects of substantially different size, a permanent reestablishment of new receiving gating and transmitter timing periods would be required.

Accordingly, the present invention provides for an object detection system comprising a constant speed device which is used to rotate suitable cooperating structure which can be utilized in conjunction with detection systems of the charater described to establish the repetition rate and the pulse width of the transmitter and the successive gating intervals of the receiver in such a manner that the repetition rate and the width of the transmitted pulse and the receiver gating intervals can be locally adjusted with respect to their duration and their relationship with respect to each other.

More specifically, a first embodiment of this invention is provided wherein a constant speed device is used to rotate a shaft upon which are mounted a plurality of non-magnetic and non-conductive discs. The period of rotation of the constant speed device is established as a function of the round-trip transit time required for a discrete pulse of energy to be reflected from the more distant reflecting surface when no object is present in the detection zone.

Moreover, the discs are disposed upon the shaft in such manner that they may be easily displaced with respect to each other. The surface area of each disc is composed of conducting and non-conducting areas. Fixed brushes are placed in registry with the surface area of the discs and each required transmitter timing and receiver gating interval is demarcated by the completion of electrical circuits which provide operating voltages to the desired transmitter and receiving circuits, by a pair of fixed brushes, each being in contact with the conductive area of a selected disc and the conductive area of a given reference disc for a common period of time dependent upon the angular velocity of the respective discs and the lengths of the conductive areas in contact with the fixed brushes.

A second embodiment is disclosed wherein a cylindrical drum is caused to be rotated by the constant speed device. The surface of the drum similarly contains conducting and non-conducting areas of varying configuration. However, in this instance, each desired receiver gating and transmitter timing interval is established by manipulating a certain one of a plurality of movable brushes with respect to one of a plurality of fixed brushes placed in contact with the surface of the drum in such a manner that each movable brush in conjunction with a fixed brush completes selected transmitting and receiving circuits for time periods established by their common contact with the specially arranged conducting areas.

Thus, it is one object of the present invention to provide an object detection systems utilizing a constant speed device which may be locally adjusted manually to operate in a plurality of environments to detect objects of varying sizes.

It is another object of this invention to provide a detection system of the character described wherein a constant speed device is utilized to rotate locally and manually adjustable mechanical apparatus for determining the transmitter repetition rate, the pulse width and the length of the receiver gating intervals and their relationship with respect to each other.

Other objects, purposes and characteristic features of this invention will in part be obvious from the accompanying drawings and in part pointed out as the description of the invention progresses.

In describing this invention in detail, reference will be made to the accompanying drawings, in which like reference characters designate corresponding parts throughout the several views and in which:

FIGS. 1A and 1B illustrate one possible mounting arrangement of the receiving and transmitting transducers of the present embodiments of this invention.

FIG. 2 illustrates one embodiment of the present invention wherein a plurality of manually manipulatable discs are rotated by a synchronous motor to establish the desired transmitted timing and the receiver gating intervals.

FIG. 3 illustrates in block diagram form, an ultrasonic detection system which may be controlled in accordance with the embodiment of the present invention in FIG. 2.

FIGS. 1A and 1B illustrate one arrangement for mounting the receiver transducer RT and the transmitting transducer TT above the surface of the roadway. This illustration also indicates the difference in the round trip transit times of a pulse which is reflected from the pavement and one which is reflected from the upper surface of a vehicle.

Figure 4:
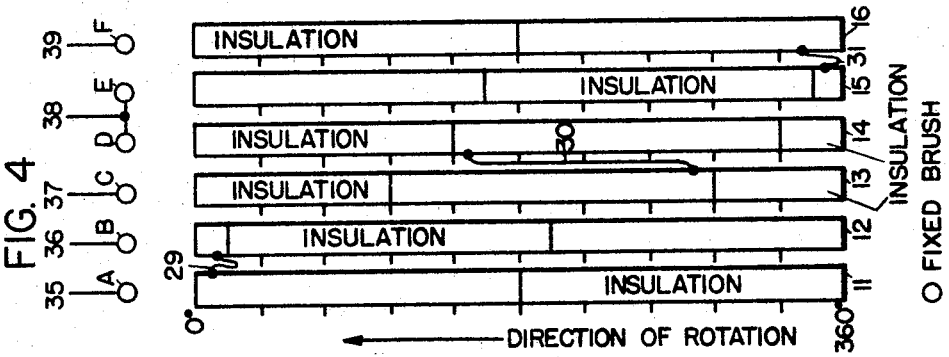
FIG. 4 is a plan view of the first embodiment of the present invention illustrating a typical indexing system for the rotating discs.

In FIG. 2 there is shown one embodiment of the present invention wherein a constant speed device such as synchronous motor 10 is used to rotate a plurality of discs 11–16. The circumferential surface of each disc is formed to have conductive areas such as copper and nonconductive areas consisting of suitable insulating strips such as one of the well-known plastics. A plurality of brushes A–F are suitably mounted to make good contact respectively with each of the discs 11–16.

The operation of the synchronous motor 10 depends upon a rotating magnetic field that is established around the air gap of the motor by currents flowing in the stator winding. The speed of such a motor varies directly as the frequency of the applied voltage and inversely as the number of poles.

Consequently, the angular velocity of the shaft 17 driven by the synchronous motor 10 will be determined by the amplified output of the variable frequency oscillator 8. Therefore, as the frequency of the oscillator is altered by the frequency adjust switch 18, the angular velocity at which the discs 11–16 rotate will be varied accordingly. These discs are positioned upon the shaft 17 and separated from each other by means of the hard rubber washers 20–25. The discs 11–16 are fastened together on the shaft by the wing nut 26. The shaft 17 is mounted for rotation within the bushing 27 mounted on the motor housing 28. The electrical conductors 29, 30 and 31 are connected to the conductive area of pairs of the discs 11–12, 13–14 and 15–16 respectively for at predetermined times allowing the brushes connected to said discs to complete electrical circuits in order to establish the desired transmitter timing and receiver gating intervals of the object detection system.

FIG. 3 illustrates broadly in block diagram form, one arrangement of an ultrasonic vehicle detection system which may be employed in conjunction with the present invention. The rotating discs 11–16 are illustrated herein in plan view. The sequence of operation of the detection system for any given position of the various discs is as follows. The interaction of the fixed brushes A and B with the conductive areas of the discs 11 and 12 respectively for a common period of time will complete an electrical circuit including the conductor 29 and wires 35 and 36 which will develop a voltage pulse which is applied to the input of the triggered ultrasonic pulse oscillator 40 causing it to generate a brief pulse of energy at a predetermined ultrasonic frequency. This pulse is amplified by the voltage amplifier 41 and power amplifier 42, with the output of this latter amplifier being applied to the transmitting transducer TT. Consequently, for each revolution of discs 11 and 12, a brief pulse of ultrasonic energy will be generated.

The period of rotation of the discs is made equal to the expected round trip transit time of a transmitted pulse which is reflected from the remote reflecting surface. This arrangement provides for the most efficient resolution as each received reflection from a vehicle in the detection zone or from the reflecting surface further away may be related to each transmitted pulse in accordance with the expected different times of reception dependent upon whether the transmitted pulse is reflected from a vehicle or from the reflecting surface. Consequently, the repetition rate of the transmitter, which is a function of the angular velocity of the rotating device is determined in accordance with the displacement of the transducers from the reflecting surface. The width of the pulse is a function of the angular velocity of the rotating device and the length of the conducting areas common to brushes A and B.

The reflected pulse is received by the receiving transducer RT and an amplified input is provided by the tuned amplifiers 43 and 44 to the rectifier filter 45. As the discs continue to rotate, brushes D and E which are connected to the output of the rectifier filter 45 by wire 38 will at different times establish common electrical connection with the brushes C and F respectively, so that a gating input is applied to either the vehicle reflection amplifier 46 or the pavement reflection amplifier 47 in accordance with the time of reception of the reflected pulse. If the output of the rectifier filter 45 corresponds to a vehicle reflected signal only, the amplifier 46 will respond to such a signal because the conductive areas on the discs 13 and 14 commonly connected by conductor 30 are so positioned with respect to the commonly connected conductive areas on the discs 11 and 12 that a common electrical connection is established between the rectifier filter 45 and the vehicle reflection amplifier 46 by means of the circuit including wire 38, brush D in contact with the conducting area of disc 14, wire 30, brush C in contact with the conducting area of disc 13, wire 37 and vehicle reflection amplifier 46 subsequent to the propagation of the transmit pulse and only throughout the interval during which a vehicle reflection signal may be expected. Similarly, a pavement reflection signal will produce an output from pavement reflection amplifier 47, since at the expected time of reception of a pavement reflection, only the conductive area of the discs 15 and 16 commonly connected by the conductor 31 will be in position to interact with the brushes E and F respectively to provide a gating voltage for the amplifier 47 over wire 39.

As pavement reflections are normally received, the output of the amplifier 47 acting upon the pavement relay control circuit 49 deenergizes the pavement reflection relay PR. However, when reflections from a vehicle are received, the output of vehicle reflection amplifier 46 is effective to cause the vehicle relay control circuit 48 to deenergize the relay VR and the absence of pavement reflections is effective to cause the pavement relay control circuit 49 to energize the relay PR to effect a suitable control such as operation of the counter 50. For specific details of this circuit arrangement, reference may be made to the aforementioned N. A. Bolton et al., Patent 3,110,009.

FIG. 4 illustrates one method of indexing or correlating the respective positioning of each pair of discs 11–12, 13–14 and 15–16 in order to effect a desired transmitter timing and receiver gating arrangement. The transmitter repetition rate which is determined by the transducer height above the pavement as measured along the line of the transmitted pulse, is established in accordance with the angular velocity of the rotating discs. One transmitted pulse is propagated for each cycle of rotation of the discs 11 and 12. The transmitted pulse width is a function of the time duration for which the brushes A and B are in contact with the conducting areas of the discs 11 and 12 respectively. Assuming for purposes of easy calculation that sound in a given environment travels at 1,000 feet per second, the time required for each cycle of rotation in milliseconds is directly translatable to the round trip transit time of a pulse in feet. If the available mounting dictates that the receiving and transmitting transducers are to be placed 49.5 feet above the reflecting surface or a round trip transit distance of 99 feet and a pulse width of 1 millisecond is selected, then the time required for a discrete pulse of transmitted sound energy to be propagated and reflected from the pavement back to the receiving transducer would be 100 milliseconds. Under these circumstances the synchronous motor 10 of FIG. 2 should be controlled by the variable frequency oscillator 8 to rotate the discs 11–16 at 600 revolutions per minute or a period of 100 milliseconds also.

The following table shows the angular velocity in revolutions per minute and cycles per second which is required of the synchronous motor 10 for selected round trip transit times in milliseconds for a one millisecond energy pulse width when the transducer height above the reflecting surface, measured in feet along the path of the pulse, is as indicated in the fourth column.

| R.p.m. | C.p.s. | Period, msec. | Transducer height from pavement, feet |
|---|---|---|---|
| 600 | 10 | 100 | 49.5 |
| 900 | 15 | 67 | 33 |
| 1,200 | 20 | 50 | 24.5 |
| 1,500 | 25 | 40 | 19.5 |
| 1,800 | 30 | 33 | 16 |

If the circumference of the discs 11–16 is assumed to be 10 inches then the index system is established in accordance with the highest expected mounting means for the transducers. If this distance is 49.5 feet or a round trip transit time of 100 milliseconds for a 1 millisecond pulse width and an index mark is provided at every inch of the disc as shown in FIG. 4, then the distance between each index mark is equal to 10 milliseconds time or 10 feet of distance in terms of the round trip transit distance of the discrete energy pulse including the generation time of the pulse.

Once having established the index for the highest expected mounting of the transducers above the pavement, if the equipment is subsequently relocated in an environment where the transducers are to be placed at a height of 24.5 feet above the reflecting surface, the motor would be caused to rotate at a speed of 1200 r.p.m. which establishes a period of 50 milliseconds for a one (1) millisecond pulse width. Each index point now represents ½ the value as originally determined or a period of 5 milliseconds calculated in time or approximately 5 feet in distance with respect to the round trip transit time of the discrete pulse of sound energy. Accordingly, for any other selected transducer height with respect to the reflecting surface, the angular velocity of the synchronous motor 10 and the value of each index point may be determined.

More specifically, assuming the indexing system for the discs has been established for a period of rotation of 100 milliseconds and the discs are 10 inches in circumference as suggested. If it were desired to relocate the equipment in a new environment where the distance from the transducer to the reflecting surface along the line of travel of the pulse was 24 feet (see FIG. 1) instead of 49.5 feet then the round trip transit distance for a pulse would be 48 feet and assuming sound to travel at 1,000 feet per second, the time of reception of the pulse after transmission would be 48 milliseconds. Moreover, assuming the generation of a two (2) millisecond instead of a 1 millisecond pulse, the complete cycle of operation would be require 50 milliseconds. Under these circumstances, the required angular velocity of the synchronous motor 10 would be 1200 revolutions per minute. Assuming the synchronous motor to be a two-pole device, the variable frequency oscillator 8 would be set to provide an output at a frequency of 20 cycles per second.

Each index point on the disc now has the value of five milliseconds in time or approximately five feet in distance travelled by the sound pulse. Utilizing the disc 11 as a reference disc, the operator of the equipment would merely loosen the wing nut 26 on the shaft 17 (FIG. 2) and rotate the disc 12 with respect to the disc 11 so that a common conducting area with respect to brushes A and B and conductor 29 of 2 milliseconds would be attained between the discs 11 and 12.

If the class of objects to be detected were to vary in height from 5 to 15 feet, the earliest expected object reflection would occur 18 milliseconds after the pulse has been propagated and the latest expected object reflection would occur 38 milliseconds after the propagation of the discrete energy pulse. The discs 13 and 14 would have to be manipulated to account for this.

The disc 14 would be rotated with respect to the disc 12 to provide that 18 milliseconds after the pulse has been propagated the brush D would come in contact with the conducting area of the disc 14. This would occur at 20 milliseconds after the beginning of the cycle or 4 index marks from the 0° point for a scale of 5 milliseconds per index point. The disc 13 would be so manipulated with respect to the disc 14 that the length of time for which the discs 13 and 14 provide a common electrical connection for the brushes C and D would be a period of 20 milliseconds or 4 index points subsequent to the time when brush D comes into contact with the conducting area of disc 14 which is connected to the conducting area of disc 13 by wire 30. Under these circumstances the output of the rectifier filter 45 (FIG. 3) would be applied to the vehicle reflection amplifier 46 for a twenty millisecond period beginning 18 milliseconds subsequent to the propagation of the transmitted pulse.

The time relationship between the establishment of the vehicle reflection gate and the subsequent pavement reflection gate will be determined by the relatively positioning of the discs 13 and 15. If a pavement reflection gate is to be established for the last 2 milliseconds of the 50-millisecond cycle, then the disc 15 is manipulated with respect to the disc 13 so that their indexing systems indicate a difference of 8 milliseconds or 1⅗ index points. During this period of 8 milliseconds the vehicle reflection amplifier 46 and the pavement reflection amplifier 47 are both gated "off." This is to reject any reflections which may be received from those classes of objects which are smaller than the 5-foot height of the smallest class of objects which it is desired to detect.

In order to establish the two-millisecond period during which the pavement reflection amplifier 47 is gated "on," the disc 16 is positioned with respect to the disc 15 to establish a conducting area made common to brushes E and F by wire 31 (representing 2 milliseconds in time or two feet in distance travelled by the sonic energy pulses.

In like manner the equipment may be moved into different environments and suitable transmitter timing periods and receiver gating periods may be established in terms of the highest expected mounting means as a function of the mounting means available and the class of objects to be detected. The broadest transmitter timing and receiver gating intervals are obtained when the conducting areas occupy one-half the surface area of each disc.

Under certain circumstances it may not be required to provide the discrimination which is brought about when both the presence of an object reflection and the absence of a pavement reflection and the subsequent presence of a pavement reflection and the absence of an object reflection is required to actuate the counter 50 (FIG. 3). If such an object detection system is utilized, the discs 13 and 14 with their interrelated brushes C and D may be eliminated and the same principles applied to establishment of the transmitter timing and the pavement reflection gating of the receiver.

Figure 5:
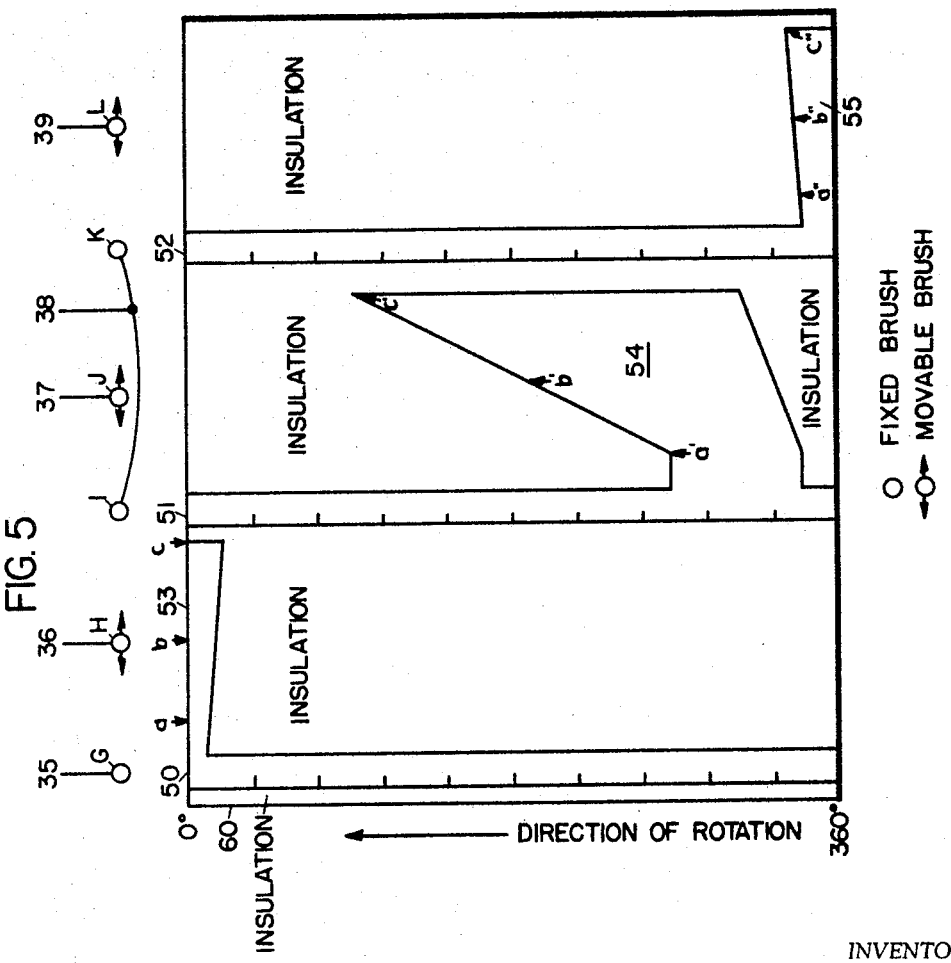
FIG. 5 is a plan view of a second embodiment of the present invention in which a rotating drum is used to establish the transmitter timing and the receiver gating intervals of the object detection system.

FIG. 5 illustrates another embodiment of the present invention where a cylinder 60 is shown in plan view and the configurations designated by areas 50–55 are employed as conducting surfaces, which in conjunction with fixed brushes G, I and K and movable brushes H, J and L, at times establish common electrical connections to the desired transmitting and receiving circuits of the object detection system. The brushes G, H, I, J, K and L have circuit connections similar to those shown for the brushes A, B, C, D, E and F respectively of FIG. 3.

The fixed brushes G, I and K are mounted as reference brushes to make contact with the linear conducting surfaces 50, 51 and 52. The movable brushes H, J and L are mounted to be in contact, at varying times with respect to each other, with the variable conducting surfaces 53, 54 and 55.

Transmitter timing is established by the common interaction of the fixed brush G and the movable brush H with the conducting strips 50 and 53 respectively. During the time when these brushes are in contact with the conducting areas 50 and 53, an electrical circuit is completed which provides a pulse for triggering the ultrasonic pulse oscillator 40 (FIG. 3). The width of the pulse is dependent upon the width of the conducting area 53 at the point of contact with movable brush H and the angular velocity at which the cylindrical drum is being rotated by the synchronous motor 10. Similarly, the vehicle reflection amplifier 46 will be gated "on" during the period of common contact of the fixed brush I and the movable brush J with the conducting areas 51 and 54, respectively and the pavement reflection amplifier 47 will be gated "on" during the period of common contact of the fixed brush K and the movable brush L with the conducting areas 52 and 55 respectively.

In order to provide for a manual establishment of the transistor timing and the receiver gating periods, the cylindrical drum is indexed as hereinbefore described. For purposes of easy calculation, let us again assume that the circumference of the cylinder is 10 inches and sound in the environment utilized travels at 1,000 feet per second. Again, we will assume an index mark is located at one-inch intervals around the circumference of the cylinder. If the transducer height with respect to the reflecting surface is established at 49½ feet or a round trip transit distance of 99 feet and a 1 millisecond second pulse is to be utilized, a complete cycle of operation of the equipment will require a period of 100 milliseconds.

In order to establish a period of 100 milliseconds, the synchronous motor 10 is caused to rotate the cylindrical drum at 600 revolutions per minute or one revolution each 100 milliseconds. Therefore, each inch or index point has a value of 10 milliseconds. Moreover, let us assume, that the smallest vehicle expected to be detected is 2½ feet, e.g. a sports car and the tallest expected vehicle is thirteen feet in height, e.g. a truck. In order to receive reflections from any vehicle in this class, the vehicle reflection amplifier 46 (FIG. 3) will have to be gated "on" for a period of 21 milliseconds beginning 74 milliseconds subsequent to the start of the cycle. The length of the conducting area for this mounting structure and this class of objects with which the movable brush J comes into contact will have to reflect this set of conditions. Additionally, we will assume that the pavement reflection amplifier 47 gating interval will be established as 2 milliseconds. This is to eliminate detection due to any unevenness of the pavement or any obstructions which might be lying in the roadway and provides us with a margin of 1 foot above the reflecting surface. The pavement reflection amplifier gating interval must be established as beginning 3 milliseconds after termination of the vehicle reflection amplifier gating interval.

To establish a cycle of operation for the rotating drum which would be effective under the conditions enumerated, it is necessary to provide that the width of the conducting area 53 at the point $a$ be equal to $\frac{1}{10}$ of an inch and suitably marked for a period of 100 milliseconds or 600 revolutions per minute. The movable brush H is placed in contact with this point and if the drum is rotated at 600 r.p.m., then the brushes H and G will be in contact with the conducting areas 53 and 50 respectively for a time equal to 1 millisecond and the width of the pulse generated by the triggered ultrasonic pulse oscillator 40 (FIG. 3) will be of this same width; that is, 1 millisecond.

As the class of objects to be detected varies from 2½ feet to 13 feet, the earliest expected vehicle reflection, which is produced by the highest sensed vehicle, will occur 73 milliseconds after transmission of the discrete energy pulse or 74 milliseconds from the beginning of the cycle. In order to reflect this condition, the point $a'$ on conducting area 54 is established 7.4 index marks from the top of the drum, i.e. the zero degree reference point on the drum. In order to account for the detection of the class of objects enumerated, the vehicle reflection amplifier 46 would have to be gated "on" for a period of 21 milliseconds, 74 milliseconds after the beginning of the cycle. The width of the conducting area 54 at the point $a'$ would then be 2.1 inches or index marks. The distance between the edge of the conducting area 54 opposite the point $a'$ and the end of the cycle must represent 5 milliseconds of the 100 millisecond cycle or 0.5 inch of nonconducting area.

In order to establish a pavement reflection gate of 2 milliseconds at the required angular velocity of the drum 60, the width of the conducting area 55 at the point $a''$ must be equal to 0.2 inch and the movable brush L must be manipulated to intersect the conducting area 55 at this point.

As the transducer height above the reflecting surface determines both the angular velocity at which the drum 60 is rotated and the period of 1 cycle, the lower the transducer height with respect to the reflecting surface, the faster the drum 60 must be rotated by the synchronous motor 10 and the wider the variable conducting area must be in order to produce the same receiver gating intervals and transmitter timing periods. If the equipment were to be transferred to a second environment wherein the transmitted pulse was to be 1 millisecond and the transducers were to be placed 24.5 feet above ground along the path of travel of the discrete energy pulse, a period of 50 milliseconds would be required.

Again assuming sound to travel at 1,000 feet per second and the circumference of the cylindrical drum 60 being 10 inches, then each index point which is separated from every other by 1 inch is equal to 5 milliseconds in time. If the class of objects again were to vary from 2.5 feet to 13 feet, the cycle of operation would be as follows.

The angular velocity of the synchronous motor 10 and the cylindrical drum 60 would be established by the variable frequency oscillator 8 (FIG. 2) at 1200 r.p.m. The width of the conducting area 53 at point $b$ would be required to be 0.2 inch and suitably indexed for an angular velocity of 1200 r.p.m.

The earliest any pulse reflection from a vehicle could be expected would be 24 milliseconds after the beginning of the cycle. The vehicle reflection amplifier 46 (FIG. 3) would be required to be gated "on" for a period of 21 milliseconds. Thus, the width of the conducting area at the point $b'$ would be 4.2 inches or index marks to reflect this situation. The edge of the conducting area 54 opposite the point $b'$ must be terminated 1 inch or 1 index mark from the end of the cycle in order to reflect 5 milliseconds of time during which the vehicle reflection amplifier would be inoperative. In order to develop a ground reflection gating interval of 2 milliseconds under the conditions enumerated, the movable brush L would be set to intersect the conducting surface 55 at point $b''$ and the width of the conducting area 55 at that point would be established at 0.4 inch.

Similarly, if the transducer height above ground, along the line of transmission of the discrete energy pulse, were 16 feet and a 1 millisecond pulse were to be transmitted, a period of rotation of the cylindrical drum would be established as 33 milliseconds, and the synchronous motor 10 would be required to rotate the drum 60 at 1800 revolutions per minute. This angular velocity would be established by the variable frequency oscillator 12.

Under these circumstances, the width of the conducting area 53 at the point $c$ would be made 0.3 of an inch. The movable brush H would be placed in contact with the conducting area 53 at this point which would be suitably marked for an angular velocity of 1800 r.p.m. The movable brush H and the fixed brush G would make common electrical connection with the conducting area 50 and the conducting area 53, causing the triggered ultrasonic pulse oscillator 40 to generate a pulse of 1 millisecond in width. The expected time of reception of a reflection from the highest vehicle to be detected would be six milliseconds after the transmission of the 1 millisecond pulse of 7 milliseconds after the start, or the cycle. Therefore the point $c'$ of the conducting area 54 would be established at approximately 2.1 inches from the zero degree point at the beginning of the cycle, as the distance between the index points is now valued at 3.3 milliseconds in time or 3.3 feet of distance.

The class of objects to be detected, which is 13 feet-2½ feet in height, again dictates an interval of 21 milliseconds during which the vehicle reflection amplifier must be gated "on." This would require that the length of the conducting area 54 at the point $c'$ be approximately 6.4 inches. With the movable brush J in contact with the point $c'$ of the conducting area 54, a common electrical connection between the movable brush J and the fixed brush I would be made for a period of 21 milliseconds during which the vehcile reflection amplifier would be gated on. The distance from the lower edge of the conducting area 54 opposite the point $c'$ to the 360° point on the cylindrical drum 60 would be indicative of 5 milliseconds in time during which the vehicle reflection amplifier 46 would again be open-circuited.

In order to establish an interval of 2 milliseconds during which the pavement reflection amplifier 47 must be gated "on," it is necessary that the conducting area 55 at the point $c''$ be approximately 0.6 inch in length when the drum is rotated at a velocity of 1800 r.p.m. This insures that when the movable brush L is set to intersect the point $c''$ a common electrical connection of the movable brush L and the fixed brush K with the conducting area 55 and the reference conducting area 52 will be established for the required interval.

The transmitter timing periods may be established by the utilization of selected conducting areas on the drum 60 in the manner described for any class of objects or any operating environment which is established by the transducer height or distance from a reflecting surface as discussed herein. Obviously, if desired, the present invention may be utilized with a system which employs only the object or the vehicle reflections to effect the desired control. All that is required in this instance is the elimination of the vehicle reflection amplifier brushes or the pavement reflection amplifier brushes as desired. The transmitter timing and the receiver gating intervals may be established for any desired class of objects operating in the environment by establishing conducting area configurations as previously described.

Having described two embodiments of the invention for an object detection system which provides for the manual adjustment of the transmitter timing and receiving gates with respect to their lengths and their relationship to each other, we desire it to be understood that various modifications, adaptations and alterations may be made to the specific form shown to meet the requirements of practice without in any manner departing from the spirit or scope of the present invention. Particularly, it should be understood that, although the appended claims refer to the system of this invention as being particularly organized for the detection of vehicles, the principles of the invention apply equally well to the detection of other objects.

What we claim is:

1. In a system for detecting objects passing through at least one detection zone defined by a beam repetitive energy pulses directed across the path of said objects, said system having transmitting means including a transducer for transmitting said energy pulses, receiving means including a transducer for receiving a reflection of each of said pulses from the energy reflecting surfaces of each object as said object passes through said zone said pulses being received only during a predetermined first interval following the transmission of each of said pulses, said receiving means also receiving during a predetermined second interval a reflection of each of said energy pulses from at least one more distant energy reflecting surface upon which said pulses impinge when no object is intercepting said beam, the combination comprising a constant speed device having locally variable angular velocity for establishing the repetition rate of said transmitting means and manually adjustable conducting means responsive to said constant speed device for at times completing electrical circuits to said transmitting means and said receiving means whereby the width of said transmitted pulse and the durations of said first and second intervals are established.

2. A system in accordance with claim 1 wherein said manually conducting adjustable means includes a cylindrical drum having varying configurations of conducting surface area thereon, and pairs of brushes situated in registry with said drum, said pairs of brushes completing circuits to provide operating voltages for one of said transmitting means and said receiving means only during time periods when both brushes of a pair of brushes are in contact with a common conducting area of said cylindrical drum, said drum being rotated by said constant speed device.

3. The invention as claimed in claim 2 wherein each of said pairs of brushes comprises a fixed brush and a manually movable brush, the position of each said movable brush controlling the duration of time periods in which said movable brush and said fixed brush of each pair of brushes are in contact with a common conducting area.

4. The system of claim 1 wherein said manually adjustable conducting means comprises a pair of discs, the circumferential surface of each disc incorporating therein a conductive strip of predetermined length, either of said discs being angularly positionable with respect to each other, and a pair of fixed contactors, each contactor being situated in registry with the circumferential surface of each respective disc and coupled to one of said electrical circuits.

5. Apparatus for manually establishing a pulse repetition rate for a system which detects objects passing through at least one detection zone defined by a beam of repetitive energy pulses directed across the path of said objects comprising, a transmitter including a transducer for transmitting said energy pulses, receiving means including a transducer responsive to a reflection of each of said energy pulses from a reflecting surface upon which said pulses impinge when no object intercepts said beam, voltage generating means, rotatable electromechanical means responsive to said voltage generating means and rotating at an angular velocity determined by the output of said voltage generating means, and manually adjustable conducting apparatus operatively connected to said electromechanical means for completing electrical control circuits to said transmitter for variable intervals to determine the pulse width and repetition rate of said transmitter as a function of the angular velocity of said electromechanical means.

6. The apparatus as claimed in claim 5 wherein said manually adjustable conducting apparatus includes a pair of brushes and a pair of discs, each disc having a conducting region on its circumferential surface and being angularly positionable with respect to the other, both said discs being drivingly coupled to said electromechanical means in a manner to produce rotation of said discs, whereby operating voltages for said transmitter are produced when each of said brushes is simultaneously in registry with the conducting region of a respective disc.

7. The apparatus as claimed in claim 5 wherein said manually adjustable conducting apparatus includes a cylindrical drum having a plurality of separate conducting surface areas thereon, and a pair of brushes situated in registry with said drum, whereby operating voltages for said transmitter are produced when each of said bushes is simultaneously in registry with a common conducting surface area of said drum.

8. The apparatus of claim 7 wherein said pair of brushes comprises a fixed brush and a manually displaceable brush, the position of said displaceable brush controlling the duration of time periods in which said displaceable brush and said fixed brush are simultaneously in registry with said common conducting surface area.

9. In a system for detecting objects passing through a detection zone defined by a beam of repetitive energy pulses directed across the path of said objects, said system having transmitting means, including a transducer for emitting said energy pulses, and receiving means including a transducer responsive to said energy pulses only during a predetermined interval following the emission of each of said pulses, said transducers being mounted at predetermined elevations above a fixed surface reflective to said energy pulses, the combination comprising a motor, means coupled to said motor for locally adjusting the angular velocity of said motor in accordance with the sum of said predetermined elevations, and manually adjustable conducting means driven by said motor, said conducting means at times completing circuits to said transmitting means and said receiving means to establish the width of said transmitted pulse and the interval of response of said receiving means, respectively.

10. The system of claim 9 wherein said manually adjustable conducting means comprises a plurality of electrically conductive surfaces and a plurality of brushes situated in registry with said surfaces, said surfaces being manually relatively displaceable with respect to said brushes.

11. The system of claim 10 wherein said surfaces are manually relatively displaceable with respect to said brushes in a direction parallel to the direction in which said surfaces are driven by said motor.

12. The system of claim 10 wherein said surfaces are manually relatively displaceable with respect to said brushes in a direction perpendicular to the direction in which said surfaces are driven by said motor.

References Cited by the Examiner

UNITED STATES PATENTS

| | | | |
|---|---|---|---|
| 2,456,441 | 12/1948 | Morrison | 318—171 |
| 3,110,009 | 11/1963 | Bolton et al. | 340—38 |

THOMAS B. HABECKER, *Acting Primary Examiner.*

NEIL C. READ, *Examiner.*